March 16, 1943.  C. T. WALTER  2,314,317
POULTRY CHILLING
Filed July 24, 1940   3 Sheets-Sheet 1

Charles T. Walter
INVENTOR
BY R. G. Story
ATTORNEY

ATTEST-

March 16, 1943.   C. T. WALTER   2,314,317
POULTRY CHILLING
Filed July 24, 1940   3 Sheets-Sheet 2

ATTEST -
Robyn Wilcox
Wm C. Meiser

Charles T. Walter
INVENTOR
BY R. G. Story
ATTORNEY

March 16, 1943.     C. T. WALTER     2,314,317
POULTRY CHILLING
Filed July 24, 1940     3 Sheets-Sheet 3

Charles T. Walter
INVENTOR
BY R. G. Story
ATTORNEY

Patented Mar. 16, 1943

2,314,317

UNITED STATES PATENT OFFICE 2,314,317

POULTRY CHILLING

Charles T. Walter, Chicago, Ill., assignor to Industrial Patents Corporation, Chicago, Ill., a corporation of Delaware Application July 24, 1940, Serial No. 347,251

10 Claims. (Cl. 62—114)

This invention relates to the quick freezing of food products and has to do particularly with improvements in the quick freezing of poultry.

An object of the invention is to provide an apparatus for carrying out an improved quick freezing process.

Another object of the invention is to provide a method of quick freezing without adversely affecting the bright natural appearance of the unfrozen product.

A further object of this invention is to provide a process for quick freezing meat products without danger of freezer burn on the outer surface thereof.

Other objects of the invention will be apparent from the description and claims which follow.

It is well known that quick freezing of food products involves advantages over slow freezing in that in the former ice crystals formed in the food are small and do not rupture the cell walls, thereby avoiding an excessive moisture loss by cellular leakage upon defrosting. Various methods have been proposed from time to time for quick freezing food products, such as poultry, but such freezing usually results in the appearance of what is known as "freezer burn" on the poultry skin. Freezer burn is, of course, objectionable as it impairs the appearance and salability of the frozen product.

The present invention is particularly adapted for quick freezing poultry in such a manner as to avoid freezer burns on the outer surface thereof.

In the ordinary freezing of poultry the carcass, either wrapped or unwrapped, is subjected to the action of a refrigerant such as cold air or brine. In my invention the carcass is drawn and the refrigerant, preferably cold air, is introduced into the body cavity. This process avoids freezer burns on the surface of the carcass, and in addition is beneficial from the health standpoint, in that the inner portion of the carcass, which ordinarily is warmer than the outside portion, is first frozen and putrefaction is thereby avoided.

The invention will be readily understood by reference to the drawings in which similar reference characters indicate similar parts in the several figures.

Figure 1:
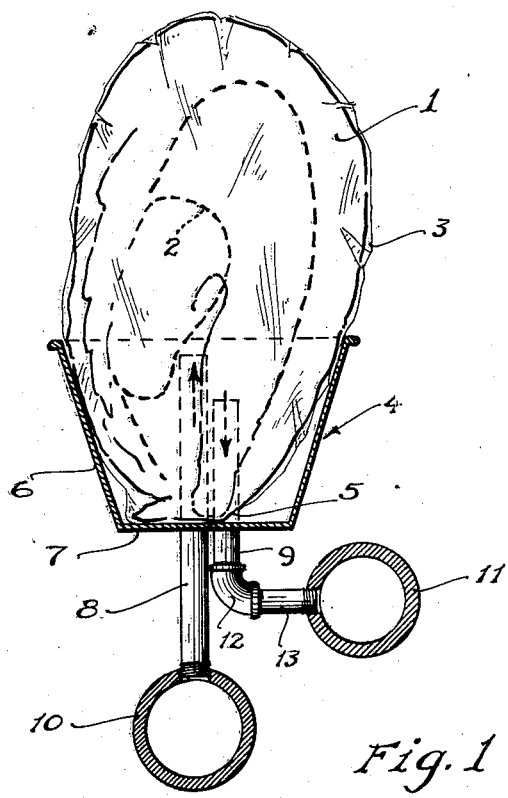
Figure 1 is a detailed view, partly in section, showing one form of apparatus involved in the present invention.
Figure 2:
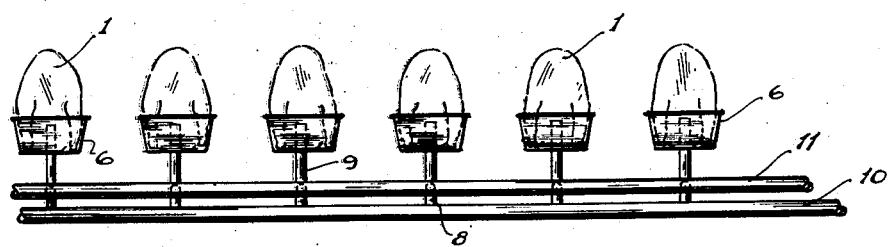
Figure 2 is a side view of the freezing element shown in Figure 1, wherein a large number of fowls can be frozen at the same time.

Figures 1 and 2 disclose an embodiment of the present invention in which each fowl is frozen individually. In these figures the fowl 1 is dressed and drawn in the usual manner. Preferably the giblets 2 will be wrapped in paper and inserted in the body cavity so that all edible portions of the fowl will be delivered to the consumer. The fowl is wrapped in cellophane 3 or similar wrapping material. The freezing apparatus 4 is then inserted into the body cavity of the fowl 1, as through the cloacal incision 5 through which the entrails and lungs were removed.

The freezing apparatus comprises a cup or bowl 6 of suitable size to hold the carcass of the fowl in an upright position. Through the bottom 7 of bowl 6 extends a cold air supply pipe 8 and an exhaust air pipe 9. The cold air pipe 8 is connected to a cold air supply pipe or header 10. The exhaust air pipe 9 is connected with an air exhaust 11 as by means of elbows 12 and connection 13.

As disclosed in Figures 1 and 2, I prefer that the supply pipe 10 and the exhaust pipe 11 be adjacent to each other, and that each is provided with a plurality of air jets 8 and outlets 9 immediately adjacent to each other, so that a plurality of carcasses can be frozen at the same time. Cold air, preferably at a temperature of zero degrees F., or lower, is forced through supply pipe 8 into the body cavity of the carcass and withdrawn through exhaust pipe 9.

Figure 3:
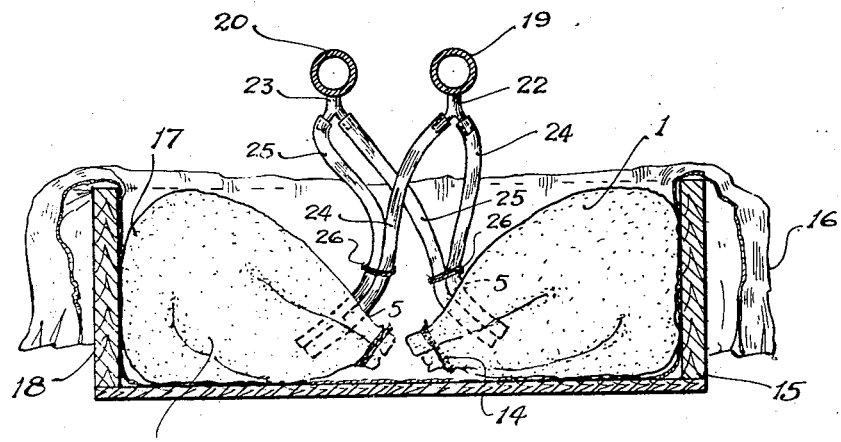
Figure 3 is a side view, partly in section, disclosing another embodiment of my invention, in which fowls are first packed in containers and then frozen.
Figure 4:
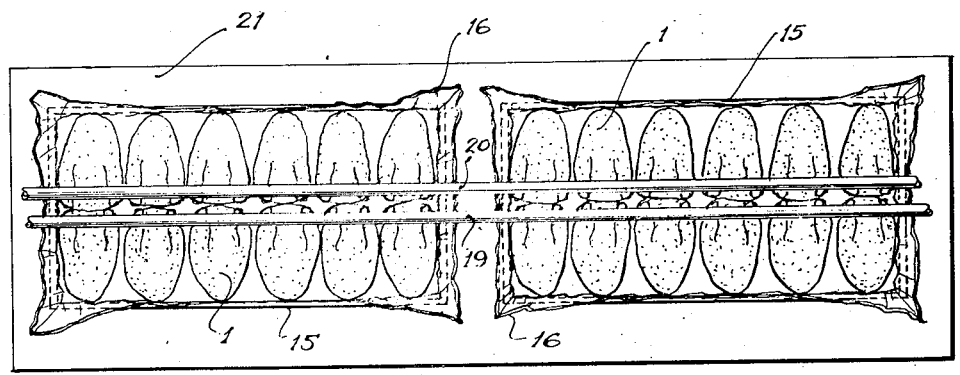
Figure 4 is a plan view of one form of apparatus suitable for freezing poultry packed in containers as shown in Figure 3.

Figures 3 and 4 disclose another embodiment of my invention in which the carcasses 1 are first packed in containers and then frozen. In this embodiment the fowls are dressed and drawn in the usual procedure. The giblets can be placed in the body cavity. In order to give each carcass a pleasing shape it is desirable to tie the legs to the body as by string 14. The carcasses are placed in boxes, 15, preferably lined with paper, Cellophane or similar material 16. I prefer to pack the poultry in double rows within the box with the breast portion 17 against the sidewalls 18 of the box.

One embodiment of the apparatus desirable for freezing the poultry so arranged is shown in Figure 4 in which a cold air supply pipe or header 19 and an exhaust header 20 are arranged longitudinally together above a table 21. Both the supply header 19 and exhaust header 20 are provided with a plurality of nipples 22 and 23 respectively, preferably Y or T shaped, so that one nipple will serve two carcasses. The nipples as shown in Figure 3 are ordinarily arranged opposite each other in the fashion above described. The branches of the nipples 22 will be provided with rubber tubes 24 and the branches of the nipples 23 will be provided with rubber tubes 25. Preferably one supply tube 24 will be tied to exhaust tube 25 adjacent the open end thereof by some suitable means as tie 26. This assists the operator in proper placement of the two tubes as a unit.

In this embodiment of the invention, the carcasses 1, packed in boxes as above described, are arranged longitudinally of the table and headers, and a supply tube 24 and an exhaust tube 25 inserted into the body cavity of each fowl, preferably by the cloacal incision 5 resulting from drawing the poultry. Cold air, preferably at a temperature of zero degrees F. or lower, is pumped through header 19 into the fowl, and exhausted though header 20.

Figure 5:
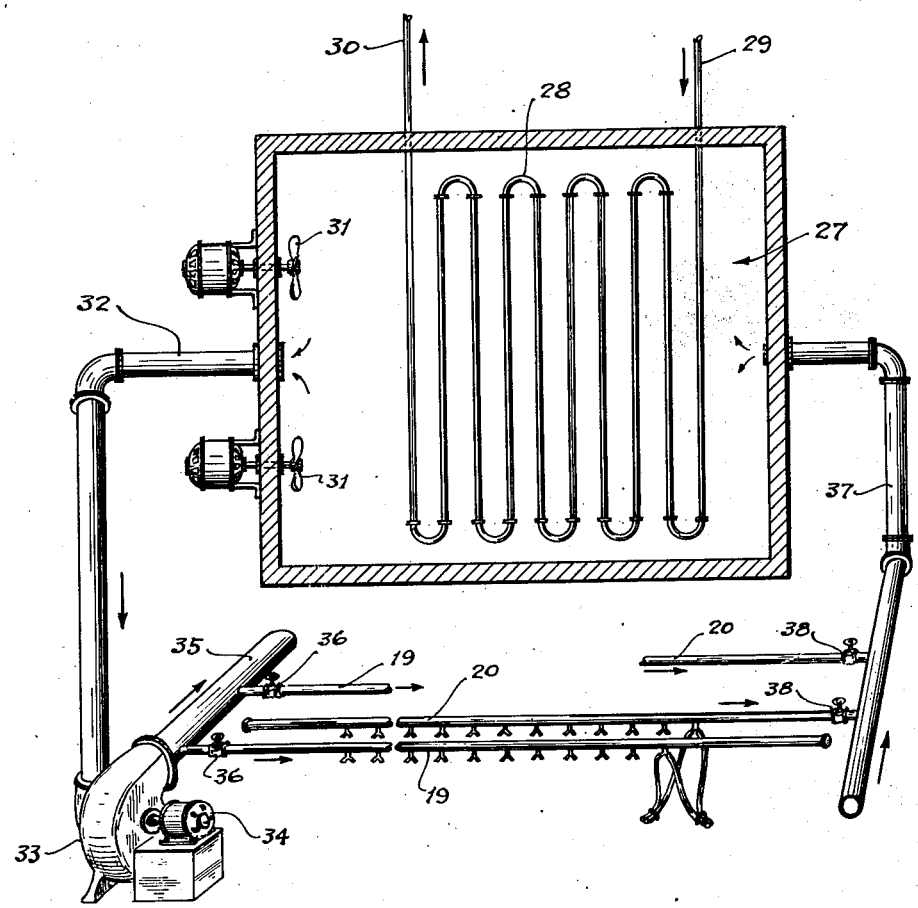
Figure 5 is a schematic view disclosing one form of apparatus suitable for freezing of poultry as disclosed in the present invention.

Figure 5 shows a schematic view of a more complete apparatus involved in the practice of the present invention. A cold air chamber 27 is equipped with refrigeration coils 28. Refrigerant is supplied to coils 28 by supply pipe 29, and returned by pipe 30 to the source of refrigeration, not shown. Preferably, the refrigeration chamber will be equipped with one or more fans 31 to secure circulation of the air throughout the chamber and to reduce the temperature of the air to that desired. A cold air supply duct 32 leads from air chamber 27 to blower fan 33, which is driven by electric motor 34. The fan 33 forces the cold air from the cold air chamber 27 into manifold 35. The headers 19 lead from this manifold 35. Preferably each such header will be provided with a valve 36 so that any one or more of the headers and their respective nozzles can be shut off from the supply of cold air to avoid waste. The exhaust headers 20 lead to a return air manifold 37 which leads to the cold air chamber 27. Likewise, the return header will be provided with valves 38 so that additional amounts of warm air will not be returned to the refrigeration chamber.

Experience has shown that drawn poultry can be frozen in the manner disclosed in this invention more rapidly than by the old method. It also discloses that the freezing from the cavity avoids freezer burns on the surface of the meat. The appearance of the product frozen in this manner is therefore superior to that of the product frozen by ordinary means. In addition, actual damage to the meat is less as most of the body cavity of poultry is surrounded by bones which are not edible, so that even though carcass burns occurred on the inside of the cavity, they would not affect the quality of the product.

The escape of the air supply which is forced into the body cavity would be uneconomical since refrigeration thereby would be wasted. For this reason I prefer to withdraw the air by means of the air exhaust shown and return it to the refrigeration chamber for rechilling.

Obviously many modifications and variations of the invention hereinbefore set forth may be made without departing from the spirit and scope thereof, and therefore only such limitations should be imposed as are indicated in the appended claims.

I claim:

1. The method of quick freezing drawn poultry which comprises injecting cold air into and in direct contact with the body cavity of the carcass.

2. The method of quick freezing drawn poultry which comprises injecting cold air at a temperature of approximately zero degrees F., or less, into and in direct contact with the body cavity of the carcass.

3. A carcass freezing device which comprises a source of fluid cold air refrigerant, a manifold, means for forced circulation of said cold air through the manifold, a plurality of headers in communication with the manifold, a plurality of nozzles attached to said headers and adapted to be inserted within the body cavity of the carcass to be frozen, and a means for holding said carcass upon said nozzles.

4. An apparatus for quick freezing of drawn poultry carcasses, which comprises a source of fluid normally gaseous refrigerant, a supply manifold, means for conveying the refrigerant to the supply manifold, flexible charge adapters for conducting refrigerant from the supply manifold to and in direct contact with the visceral cavities of the carcasses, and means including flexible exhaust adapters for withdrawing circulated gaseous refrigerant medium from said cavity and returning said refrigerant medium to the source of supply.

5. A poultry quick freezing device which comprises a source of fluid normally gaseous refrigerant, a manifold, means for forced circulation of said refrigerant through said manifold, a plurality of headers connected with said manifold, each equipped with a plurality of nozzles adapted to be inserted within the body cavity of the poultry to be frozen, exhaust tubes adjacent to said nozzles, and means including a manifold to return the refrigerant to the source of refrigeration.

6. The method of quick freezing drawn fowl without contamination which comprises injecting a fluid, normally-gaseous refrigerant into direct contact with the body cavity of the fowl so that the fowl is quickly frozen and the refrigerant medium leaves the body cavity as a gas.

7. The method of quick freezing drawn fowl without contamination which comprises bringing a fluid, normally-gaseous refrigerant into direct contact with the body cavity of the fowl so that the fowl is rapidly frozen, and withdrawing the circulated gaseous refrigerant medium from the body cavity without substantial loss to the surrounding atmosphere.

8. The method of quick freezing drawn fowl without contamination which comprises injecting at least one stream of fluid, normally-gaseous refrigerant into direct contact with the body cavity of the fowl so that the fowl is rapidly frozen, and simultaneously withdrawing a corresponding amount of the circulated gaseous refrigerant medium from the body cavity without substantial loss to and dilution by the surrounding atmosphere so that it may be reused as a refrigerant without excess heat exchange.

9. The method of quick freezing drawn fowl without contamination which comprises injecting at least one stream of cold air refrigerant into direct contact with the body cavity of the fowl so that the fowl is rapidly frozen, and simultaneously withdrawing a corresponding amount of the circulated cold air from the body cavity without substantial loss to and dilution by the surrounding atmosphere.

10. A device for the quick freezing of foods having cavities therein which comprises a source of fluids, normally-gaseous refrigerant, a nozzle for insertion in the cavity of the food product to be frozen, means for supplying the fluid refrigerant to the nozzle through a small opening in the food product leading to the cavity, means for withdrawing gaseous refrigerant medium from the cavity said means being adjacent to the means for supplying the refrigerant so that it may pass through the same opening leading to the cavity.

CHARLES T. WALTER.